(12) United States Patent  
Tetsuka

(10) Patent No.: US 11,888,329 B2  
(45) Date of Patent: Jan. 30, 2024

(54) POWER OVER FIBER SYSTEM AND FEED LIGHT VISUALIZATION LID MEMBER

(71) Applicant: KYOCERA CORPORATION, Kyoto (JP)

(72) Inventor: Nobuyuki Tetsuka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 218 days.

(21) Appl. No.: 17/612,561

(22) PCT Filed: May 25, 2020

(86) PCT No.: PCT/JP2020/020616  
§ 371 (c)(1),  
(2) Date: Nov. 18, 2021

(87) PCT Pub. No.: WO2020/246298  
PCT Pub. Date: Dec. 10, 2020

(65) Prior Publication Data  
US 2022/0239157 A1    Jul. 28, 2022

(30) Foreign Application Priority Data  
Jun. 6, 2019    (JP) .................................. 2019-105978

(51) Int. Cl.  
*H02J 50/30*    (2016.01)  
*H04B 10/50*    (2013.01)  
*H04B 10/80*    (2013.01)

(52) U.S. Cl.  
CPC ............ *H02J 50/30* (2016.02); *H04B 10/503* (2013.01); *H04B 10/80* (2013.01)

(58) Field of Classification Search  
CPC ....... H02J 50/30; H04B 10/503; H04B 10/80; H04B 10/50  
See application file for complete search history.

(56) References Cited

FOREIGN PATENT DOCUMENTS

| JP | 201093686 A | 4/2010 |
| JP | 2010135989 A | 6/2010 |
| JP | 201826684 A | 2/2018 |

OTHER PUBLICATIONS

Takahiro Kubo et al., "Service Visualization Technique for Optical Access System", NTT Access Network Service Systems Laboratories, NTT Corporation, 2007, pp. 260, 4p.

*Primary Examiner* — Robert L Deberadinis  
(74) *Attorney, Agent, or Firm* — HAUPTMAN HAM, LLP

(57) ABSTRACT

A power over fiber system includes a power sourcing equipment, a powered device, an optical fiber cable and an openable/closeable or attachable/detachable lid member. The power sourcing equipment includes a semiconductor laser that oscillates with electric power, thereby outputting feed light. The powered device includes a photoelectric conversion element that converts the feed light output by the power sourcing equipment into electric power. The optical fiber cable transmits the feed light from the power sourcing equipment to the powered device. The feed light is invisible light. The lid member covers an outgoing portion from which the feed light goes out. At least part of a light receiving portion of the lid member, the light receiving portion receiving the feed light, is made of a wavelength conversion material that converts a wavelength of the feed light into a wavelength of visible light.

10 Claims, 5 Drawing Sheets

POWER OVER FIBER SYSTEM AND FEED LIGHT VISUALIZATION LID MEMBER

RELATED APPLICATIONS

The present application is a National Phase of International Application No. PCT/JP2020/020616 filed May 25, 2020, which claims priority to Japanese Application No. 2019-105978, filed Jun. 6, 2019.

TECHNICAL FIELD

The present disclosure relates to optical power supply.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

By the way, if invisible light beams are used as feed light, a user or the like cannot easily determine whether the feed light is being released to the outside.

In optical power supply, transmission of higher energy light is expected.

An optical power supply system using a high-power laser for power supply may cause injuries or accidents by a user or the like handling an optical fiber or another module thereof without being aware of release of feed light. Such accidents are desired to be prevented.

Solution to Problem

A power over fiber system according to an aspect of the present disclosure includes:
a power sourcing equipment including a semiconductor laser that oscillates with electric power, thereby outputting feed light;
a powered device including a photoelectric conversion element that converts the feed light output by the power sourcing equipment into electric power; and
an optical fiber cable that transmits the feed light from the power sourcing equipment to the powered device,
wherein the feed light is invisible light,
wherein the power over fiber system further comprises an openable/closeable or attachable/detachable lid member that covers an outgoing portion from which the feed light goes out, and
wherein at least part of a light receiving portion of the lid member, the light receiving portion receiving the feed light, is made of a wavelength conversion material that converts a wavelength of the feed light into a wavelength of visible light.

DESCRIPTION OF EMBODIMENTS

Hereinafter, embodiments of the present disclosure will be described with reference to the drawings.

(1) Outline of System

First Embodiment

Figure 1:
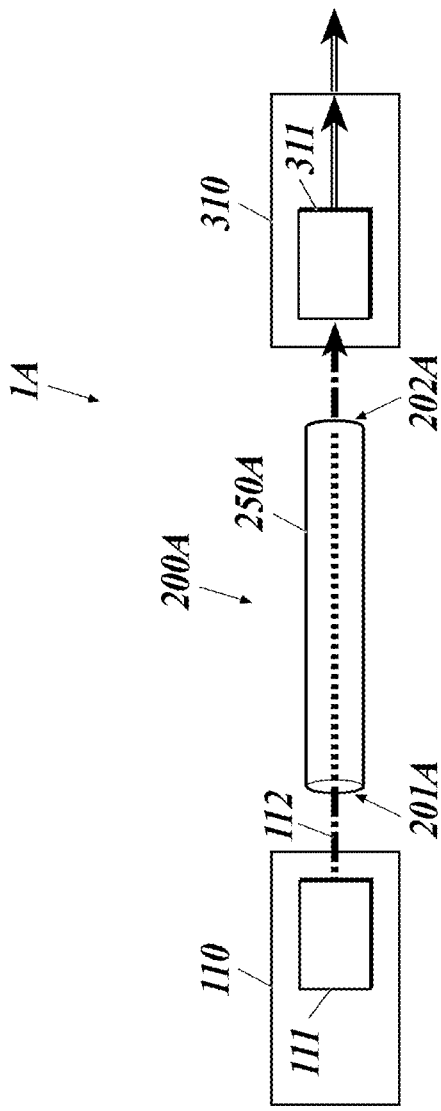
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
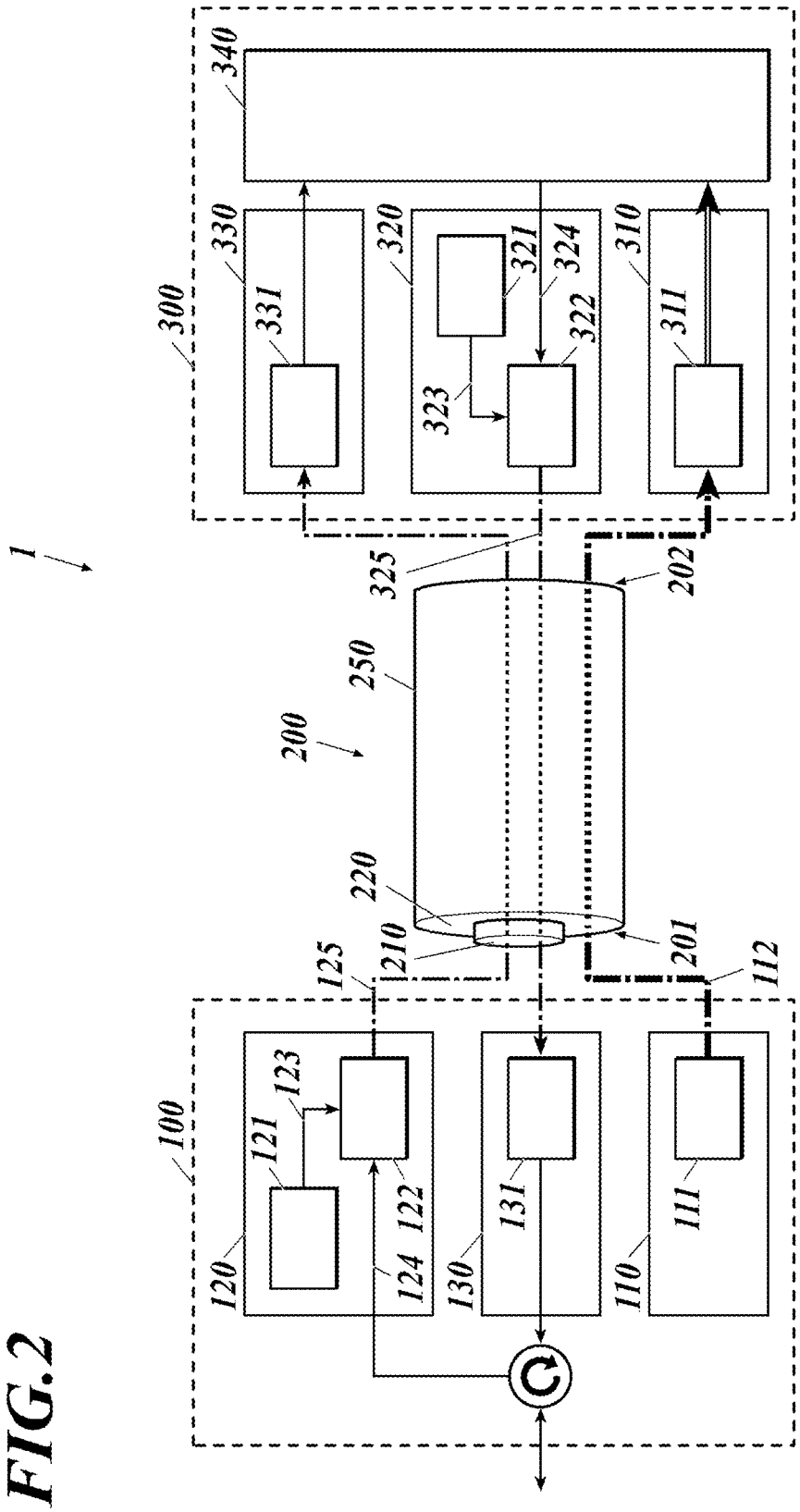
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
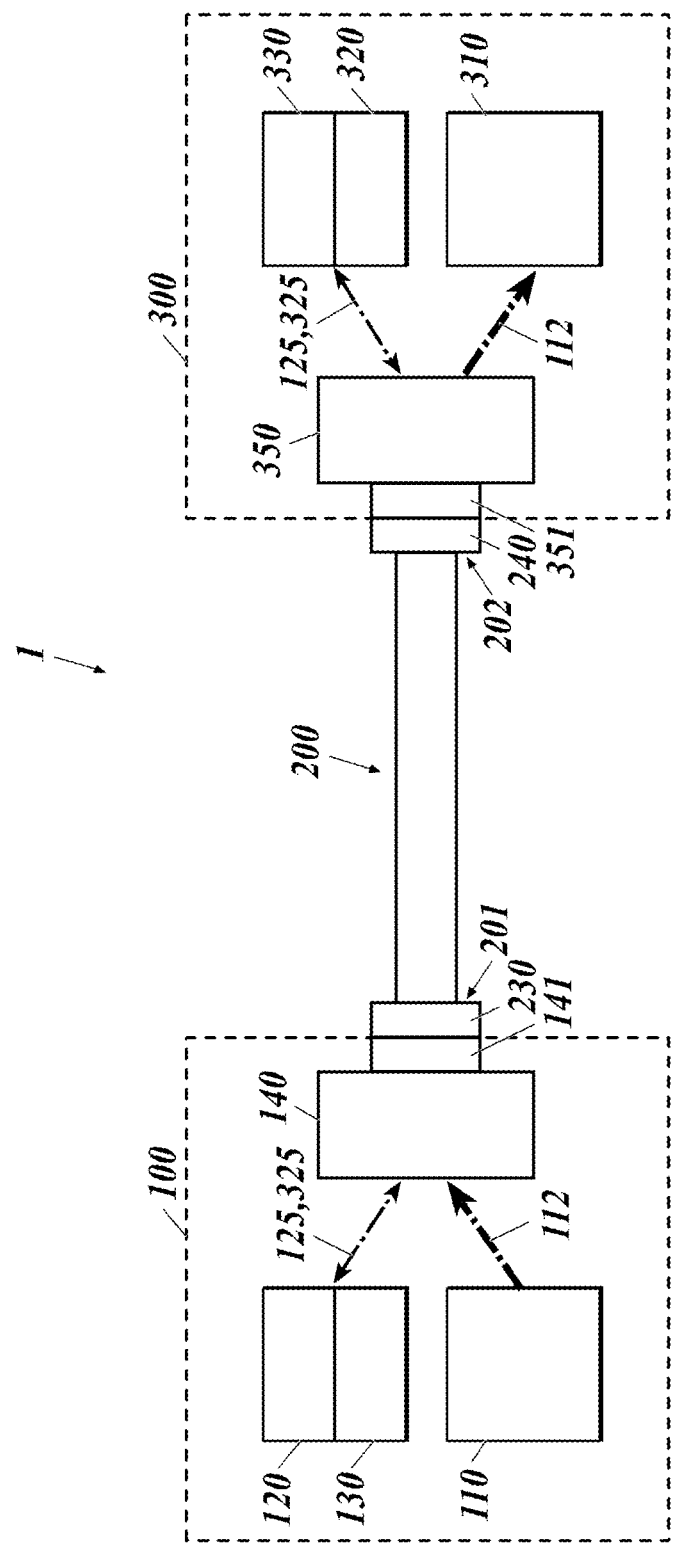
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
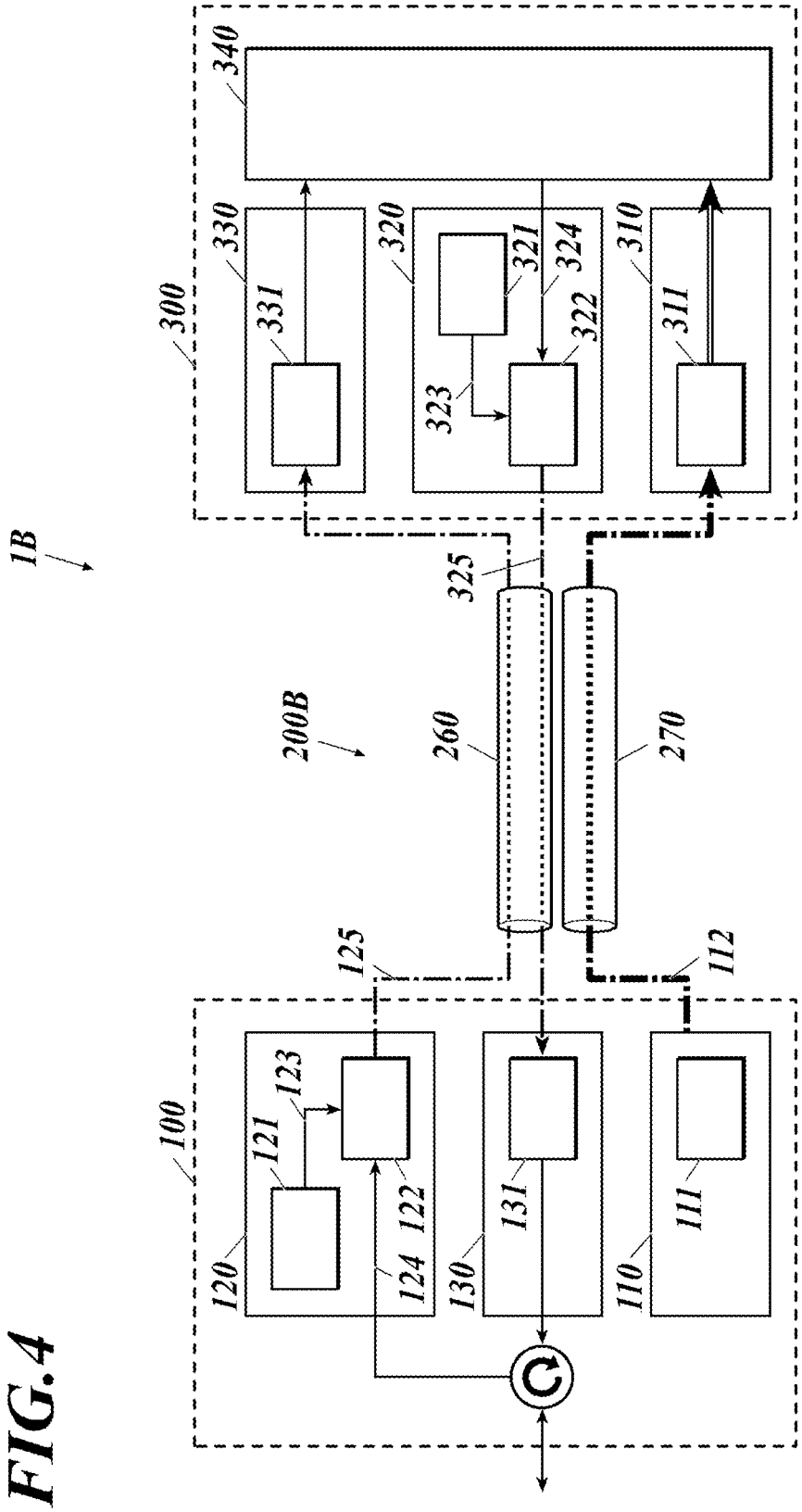
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Embodiments of Lid Member

Next, embodiments of a lid member will be described with reference to FIG. 5 and FIG. 6.

Assume that the feed light 112 is invisible light.

Application of a high-power semiconductor laser 111 for power supply may cause injuries or accidents by a user or the like handling an optical fiber or another module without being aware of release of the feed light 112.

Figure 5:
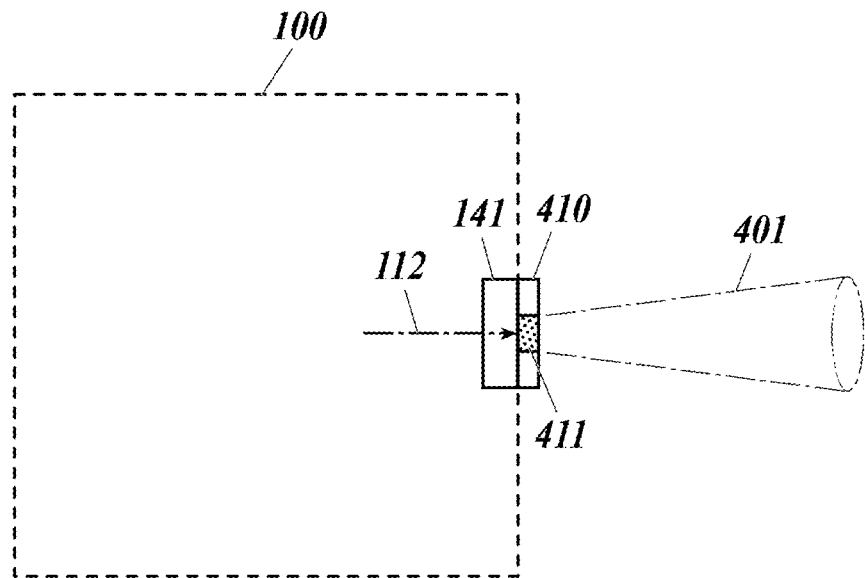
FIG. 5 is a schematic view showing a configuration in which an optical connector of a power sourcing equipment has a lid member.
Figure 6:
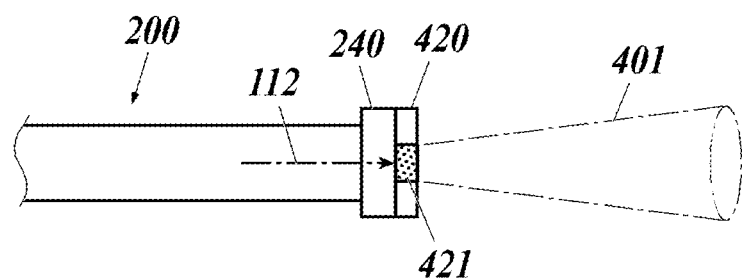
FIG. 6 is a schematic view showing a configuration in which an optical connector at an end of an optical fiber cable has a lid member.

Hence, as shown in FIG. 5 or FIG. 6, an openable/closable or attachable/detachable lid member 410/420 that covers an outgoing portion from which the feed light 112 goes out is provided.

FIG. 5 shows a configuration in which, as the lid member, a lid member 410 covering a feed light outgoing portion (opening of the optical connector 141) of the power sourcing equipment 110 is provided. FIG. 6 shows a configuration in which, as the lid member, a lid member 420 covering a feed light outgoing portion (opening of the optical connector 240) of the optical fiber cable 200 is provided.

At least part of a light receiving portion of the lid member 410/420, the light receiving portion receiving the feed light 112, is made of a wavelength conversion material 411/421, such as a fluorescent material, which converts the wavelength of the feed light 112 into a wavelength of visible light.

Hence, if, as shown in FIG. 5, the optical connector 230 is disconnected from the optical connector 141 and output of the feed light 112 is not stopped, the feed light 112 is released to the outside as visible light 401 into which the feed light 112 has been converted by the wavelength conversion material 411.

This enables the user or the like to find, at an early stage, with his/her eyes that the feed light 112 is being output and take measures, for example, stop the output of the feed light 112, to prevent injuries or accidents.

Further, if the optical fiber cable 200 is connected to the first data communication device 100 at the power supplying side, and, as shown in FIG. 6, the optical connector 240 is not connected to the optical connector 351 and output of the feed light 112 is not stopped, the feed light 112 is released to the outside as visible light 401 into which the feed light 112 has been converted by the wavelength conversion material 421.

This enables the user or the like to find, at an early stage, with his/her eyes that the feed light 112 is being output and take measures, for example, stop the output of the feed light 112, to prevent injuries or accidents.

The lid member 410/420 may be embodied in an attachable/detachable form, such as a cap, or may be embodied in an openable/closable form, such as a lid member connected to and supported by the connector 141 (240).

Although some embodiments of the present disclosure have been described above, these embodiments are made for purposes of illustration and example only. The present invention can be carried out in various other forms, and each component may be omitted, replaced or modified/changed within a range not departing from the scope of the present invention.

The above (2) has been described with the second embodiment as the basis, but it is a matter of course that the same is applicable to the first embodiment, where components of an optical communication system are excluded.

INDUSTRIAL APPLICABILITY

The present invention is applicable to a power over fiber system and a feed light visualization lid member.

The invention claimed is:

1. A power over fiber system comprising:
a power sourcing equipment including a semiconductor laser that oscillates with electric power, thereby outputting feed light;
a powered device including a photoelectric conversion element that converts the feed light output by the power sourcing equipment into electric power; and
an optical fiber cable that transmits the feed light from the power sourcing equipment to the powered device,
wherein the feed light is invisible light,
wherein the power over fiber system further comprises an openable/closeable or attachable/detachable lid member that covers an outgoing portion from which the feed light goes out, and
wherein at least part of a light receiving portion of the lid member, the light receiving portion receiving the feed light, is made of a wavelength conversion material that converts a wavelength of the feed light into a wavelength of visible light.

2. The power over fiber system according to claim 1, wherein, as the lid member, a lid member covering a feed light outgoing portion of the optical fiber cable is provided.

3. The power over fiber system according to claim 2, wherein, as the lid member, a lid member covering a feed light outgoing portion of the power sourcing equipment is provided.

4. The power over fiber system according to claim 3, wherein a semiconductor material of a semiconductor region of the semiconductor laser, the semiconductor region exhibiting a light-electricity conversion effect, is a laser medium having a laser wavelength of 500 nm or less.

5. The power over fiber system according to claim 2, wherein a semiconductor material of a semiconductor region of the semiconductor laser, the semiconductor region exhibiting a light-electricity conversion effect, is a laser medium having a laser wavelength of 500 nm or less.

6. The power over fiber system according to claim 1, wherein, as the lid member, a lid member covering a feed light outgoing portion of the power sourcing equipment is provided.

7. The power over fiber system according to claim 6, wherein a semiconductor material of a semiconductor region of the semiconductor laser, the semiconductor region exhibiting a light-electricity conversion effect, is a laser medium having a laser wavelength of 500 nm or less.

8. The power over fiber system according to claim 1, wherein a semiconductor material of a semiconductor region of the semiconductor laser, the semiconductor region exhibiting a light-electricity conversion effect, is a laser medium having a laser wavelength of 500 nm or less.

9. A feed light visualization lid member being a lid member covering, of a power sourcing equipment including a semiconductor later that oscillates with electric power, thereby outputting feed light being invisible light, an outgoing portion from which the feed light goes out,
wherein at least part of a light receiving portion of the lid member, the light receiving portion receiving the feed light, is made of a wavelength conversion material that converts a wavelength of the feed light into a wavelength of visible light.

10. A feed light visualization lid member being a lid member covering, of an optical fiber cable that transmits feed light being invisible light from a power sourcing equipment to a powered device of a power over fiber system, an outgoing portion from which the feed light goes out,
wherein at least part of a light receiving portion of the lid member, the light receiving portion receiving the feed light, is made of a wavelength conversion material that converts a wavelength of the feed light into a wavelength of visible light.

* * * * *